US010394966B2

(12) United States Patent
Ghafourifar et al.

(10) Patent No.: US 10,394,966 B2
(45) Date of Patent: Aug. 27, 2019

(54) SYSTEMS AND METHODS FOR MULTI-PROTOCOL, MULTI-FORMAT UNIVERSAL SEARCHING

(71) Applicant: Entefy Inc., Palo Alto, CA (US)

(72) Inventors: Alston Ghafourifar, Los Altos Hills, CA (US); Mehdi Ghafourifar, Los Altos Hills, CA (US); Brienne Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 549 days.

(21) Appl. No.: 14/986,252

(22) Filed: Dec. 31, 2015

(65) Prior Publication Data

US 2017/0193084 A1 Jul. 6, 2017

(51) Int. Cl.
*G06F 17/30* (2006.01)
*G06Q 10/10* (2012.01)
*H04L 12/58* (2006.01)

(52) U.S. Cl.
CPC .. *G06F 17/30675* (2013.01); *G06F 17/30702* (2013.01); *G06F 17/30979* (2013.01); *G06Q 10/107* (2013.01); *H04L 51/22* (2013.01)

(58) Field of Classification Search
CPC ......... G06F 17/30675; G06F 17/30702; G06F 17/30979; G06Q 10/107; H04L 51/22
USPC ....................................................... 707/728
See application file for complete search history.

(56) References Cited

U.S. PATENT DOCUMENTS

| | | |
|---|---|---|
| 5,481,597 A | 1/1996 | Given |
| 5,951,638 A | 9/1999 | Hoss |
| 6,101,320 A | 8/2000 | Schuetze |
| 6,950,502 B1 | 9/2005 | Jenkins |
| 7,450,937 B1 | 11/2008 | Claudatos |
| 7,673,327 B1 | 3/2010 | Polis |
| 7,680,752 B1 | 3/2010 | Clune, III |
| 7,886,000 B1 | 2/2011 | Polis |
| 7,908,647 B1 | 3/2011 | Polis |

(Continued)

FOREIGN PATENT DOCUMENTS

| | | |
|---|---|---|
| WO | 9931575 | 6/1999 |
| WO | 2013112570 A1 | 8/2013 |

OTHER PUBLICATIONS

Guangyi Xiao et al., "User Interoperability With Heterogeneous IoT Devices Through Transformation," pp. 1486-1496, 2014.

(Continued)

*Primary Examiner* — Hosain T Alam
*Assistant Examiner* — Nicholas E Allen
(74) *Attorney, Agent, or Firm* — Blank Rome LLP

(57) ABSTRACT

This disclosure relates to systems, methods, and computer readable media for performing multi-format, multi-protocol personalized searching in a manner that is most beneficial for the individual user. Personalized searching can be achieved by obtaining a plurality of data objects for a first user. The data objects can exist in a wide variety of formats and can be received via a number of protocols. One or more message objects can be created for each of the data objects, according to a standardized format and stored. The universal message objects can be indexed in a manner that is personal to the user, and in accordance with one or more parameters that can be updated on an ongoing or periodic basis, in accordance with the actions of the user, or any combination thereof.

20 Claims, 10 Drawing Sheets

(56) References Cited

U.S. PATENT DOCUMENTS

| | | |
|---|---|---|
| 8,090,787 B2 | 1/2012 | Polis |
| 8,095,592 B2 | 1/2012 | Polis |
| 8,108,460 B2 | 1/2012 | Polis |
| 8,112,476 B2 | 2/2012 | Polis |
| 8,122,080 B2 | 2/2012 | Polis |
| 8,156,183 B2 | 4/2012 | Polis |
| 8,281,125 B1 | 10/2012 | Briceno |
| 8,296,360 B2 | 10/2012 | Polis |
| 8,433,705 B1 | 4/2013 | Dredze |
| 8,438,223 B2 | 5/2013 | Polis |
| 8,458,256 B2 | 6/2013 | Polis |
| 8,458,292 B2 | 6/2013 | Polis |
| 8,458,347 B2 | 6/2013 | Polis |
| 8,468,202 B2 | 6/2013 | Polis |
| 8,959,156 B2 | 2/2015 | Polis |
| 2002/0133509 A1 | 9/2002 | Johnston |
| 2002/0152091 A1 | 10/2002 | Nagaoka |
| 2002/0178000 A1 | 11/2002 | Aktas |
| 2002/0194322 A1 | 12/2002 | Nagata |
| 2004/0117507 A1 | 6/2004 | Torma |
| 2004/0137884 A1 | 7/2004 | Engstrom |
| 2004/0243719 A1 | 12/2004 | Roselinsky |
| 2004/0266411 A1 | 12/2004 | Galicia |
| 2005/0015443 A1 | 1/2005 | Levine |
| 2005/0080857 A1 | 4/2005 | Kirsch |
| 2005/0198159 A1 | 9/2005 | Kirsch |
| 2006/0193450 A1 | 8/2006 | Flynt |
| 2007/0054676 A1 | 3/2007 | Duan |
| 2007/0073816 A1 | 3/2007 | Kumar |
| 2007/0116195 A1 | 5/2007 | Thompson |
| 2007/0130273 A1 | 6/2007 | Huynh |
| 2007/0237135 A1 | 10/2007 | Trevallyn-Jones |
| 2007/0299796 A1 | 12/2007 | MacBeth |
| 2008/0062133 A1 | 3/2008 | Wolf |
| 2008/0088428 A1 | 4/2008 | Pitre |
| 2008/0112546 A1 | 5/2008 | Fletcher |
| 2008/0236103 A1 | 10/2008 | Lowder |
| 2008/0261569 A1 | 10/2008 | Britt |
| 2009/0016504 A1 | 1/2009 | Mantell |
| 2009/0119370 A1 | 5/2009 | Stern |
| 2009/0177477 A1 | 7/2009 | Nenov |
| 2009/0177484 A1 | 7/2009 | Davis |
| 2009/0177744 A1 | 7/2009 | Marlow |
| 2009/0181702 A1 | 7/2009 | Vargas |
| 2009/0271486 A1 | 10/2009 | Ligh |
| 2009/0292814 A1 | 11/2009 | Ting |
| 2009/0299996 A1 | 12/2009 | Yu |
| 2010/0057872 A1 | 3/2010 | Koons |
| 2010/0210291 A1 | 8/2010 | Lauer |
| 2010/0220585 A1 | 9/2010 | Poulson |
| 2010/0223341 A1 | 9/2010 | Manolescu |
| 2010/0229107 A1 | 9/2010 | Turner |
| 2010/0250578 A1* | 9/2010 | Athsani ............ G06F 17/30867 707/765 |
| 2010/0312644 A1 | 12/2010 | Borgs |
| 2010/0323728 A1 | 12/2010 | Gould |
| 2010/0325227 A1 | 12/2010 | Novy |
| 2011/0010182 A1 | 1/2011 | Turski |
| 2011/0051913 A1 | 3/2011 | Kesler |
| 2011/0078247 A1 | 3/2011 | Jackson |
| 2011/0078256 A1 | 3/2011 | Wang |
| 2011/0078267 A1 | 3/2011 | Lee |
| 2011/0130168 A1 | 6/2011 | Vendrow |
| 2011/0194629 A1 | 8/2011 | Bekanich |
| 2011/0219008 A1 | 9/2011 | Been |
| 2011/0265010 A1 | 10/2011 | Ferguson |
| 2011/0276640 A1 | 11/2011 | Jesse |
| 2011/0295851 A1 | 12/2011 | El-Saban |
| 2012/0016858 A1 | 1/2012 | Rathod |
| 2012/0209847 A1 | 8/2012 | Rangan |
| 2012/0210253 A1 | 8/2012 | Luna |
| 2012/0221962 A1 | 8/2012 | Lew |
| 2013/0018945 A1 | 1/2013 | Vendrow |
| 2013/0024521 A1 | 1/2013 | Pocklington |
| 2013/0067345 A1 | 3/2013 | Das |
| 2013/0097279 A1 | 4/2013 | Polis |
| 2013/0111487 A1 | 5/2013 | Cheyer |
| 2013/0127864 A1 | 5/2013 | Nevin, III |
| 2013/0151508 A1 | 6/2013 | Kurabayashi |
| 2013/0197915 A1 | 8/2013 | Burke |
| 2013/0262385 A1* | 10/2013 | Kumarasamy .... G06F 17/30581 707/634 |
| 2013/0262852 A1 | 10/2013 | Roeder |
| 2013/0267264 A1 | 10/2013 | Abuelsaad |
| 2013/0268516 A1 | 10/2013 | Chaudhri |
| 2013/0304830 A1 | 11/2013 | Olsen |
| 2013/0325343 A1* | 12/2013 | Blumenberg .......... G01C 21/00 701/533 |
| 2013/0332308 A1 | 12/2013 | Linden |
| 2014/0020047 A1 | 1/2014 | Liebmann |
| 2014/0032538 A1* | 1/2014 | Arngren ............ G06F 17/30321 707/723 |
| 2014/0149399 A1* | 5/2014 | Kurzion ............ G06F 17/30867 707/723 |
| 2014/0270131 A1 | 9/2014 | Hand |
| 2014/0280460 A1 | 9/2014 | Nemer |
| 2014/0297807 A1 | 10/2014 | Dasgupta |
| 2015/0039887 A1 | 2/2015 | Kahol |
| 2015/0095127 A1 | 4/2015 | Patel |
| 2015/0186455 A1 | 7/2015 | Horling |
| 2015/0261496 A1 | 9/2015 | Faaborg |
| 2015/0278370 A1 | 10/2015 | Stratvert |
| 2015/0281184 A1 | 10/2015 | Cooley |
| 2015/0286747 A1 | 10/2015 | Anastasakos |
| 2015/0286943 A1 | 10/2015 | Wang |
| 2015/0339405 A1 | 11/2015 | Vora |
| 2016/0078030 A1 | 3/2016 | Brackett |
| 2016/0087944 A1 | 3/2016 | Downey |
| 2016/0092959 A1 | 3/2016 | Gross |
| 2016/0173578 A1 | 6/2016 | Sharma |
| 2017/0206276 A1 | 7/2017 | Gill |
| 2018/0101506 A1 | 4/2018 | Hodaei |

OTHER PUBLICATIONS

Marr, Bernard, Key Business Analytics, Feb. 2016, FT Publishing International, Ch. 17 "Neural Network Analysis" (Year: 2016).

\* cited by examiner

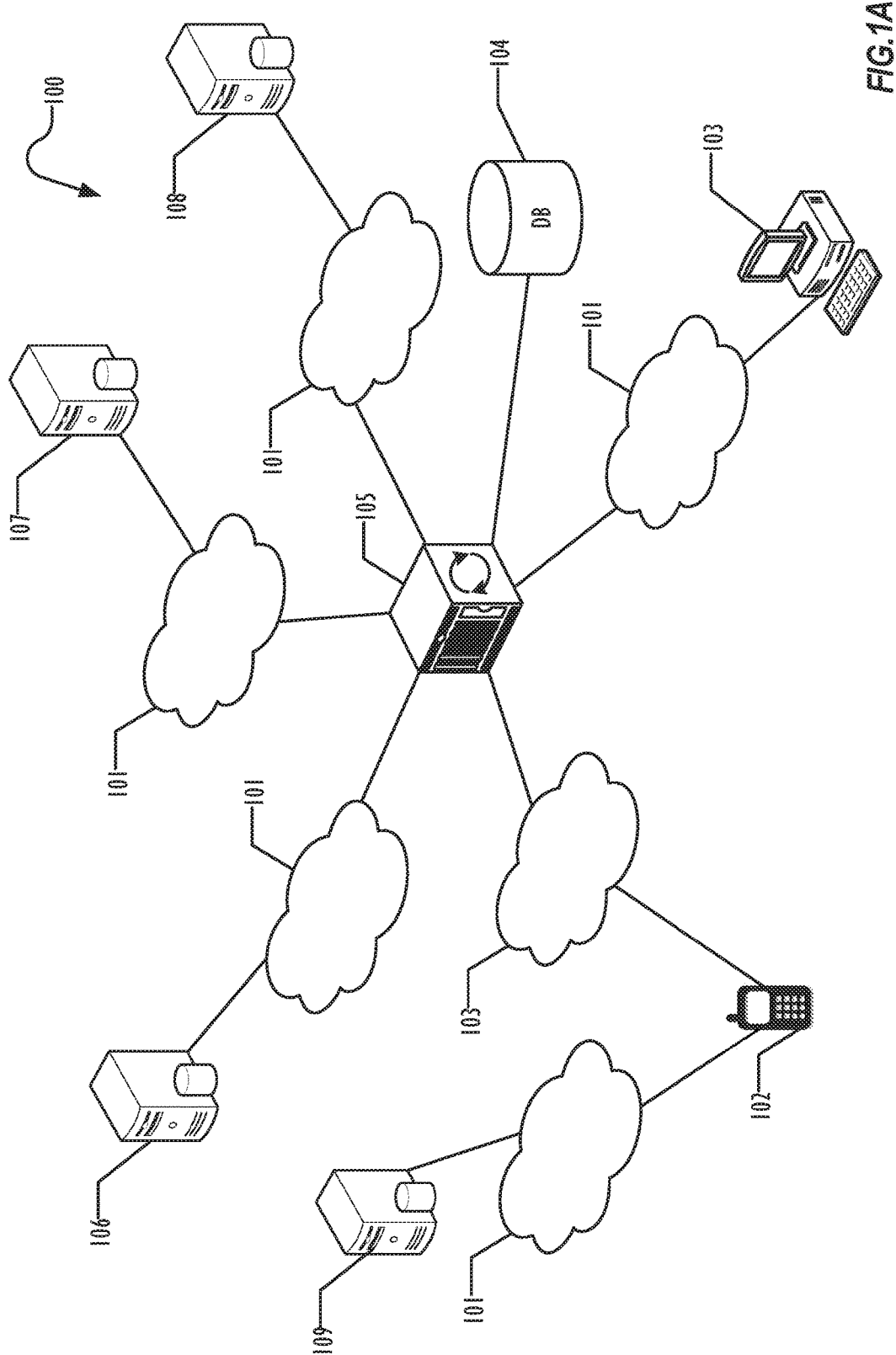

```
{
"id": "545436576657",
"attachments": [
{
"id": "497605705665",
"fileName": "amazing.mp4",
"fileSize": 8457237357
}
],
"body": {
"text": "Hey guys, we are modifying company policy regarding email
messsages tomorrow,
so please be on the lookout for a followup",
"html": "<p> Hey guys, we are modifying company policy regarding
email messsages
tomorrow<table><row> , so please be on the lookout for </row><row>
a followup </row></table>
</p>"
},
"createdOn": "2012-10-09T20:30:40.678Z",
"currentMsgGrpId": "789437489320",
"date": "2012-10-09T20:30:40.678+00:00",
"headers": {
"x-mailer": "coolcompany.com"
},
"isAReply": false,
"isFlagged": false,
"isForwarded": false,
"isOutgoing": true,
"isRead": true,
"isRepliedTo": false,
"importanceLevel": 5,
"linksTo": "894324893248",
"participants": [
{
"from": [
{
"contact": {
"id": "63423324", "name": "Bob Jones",
"photoUrl": "awesome-pics.com/2837635958764.jpg",
"isMostLikely": true
},
"serviceIdentifier": {
"id": "3249855782346",
"address": "6509284736",
"type": "sms"
}
}
],
```

*FIG. 4A*

```
"to": [
{
"contact": {
"id": "1139178368",
"name": "Sam Smith",
"photoUrl": "awesome-pics.com/2837632958764.jpg"
},
"serviceIdentifier": {
"id": "-23485763425",
"address": "5553625143",
"type": "sms"
}
}
],
"cc": [],
"bcc": []
},
{
"from": [
{
"contact": {
"id": "63423324",
"name": "Bob Jones",
"photoUrl": "awesome-pics.com/2837635958764.jpg",
"isMostLikely": true
},
"serviceIdentifier": {
"id": "7846320423",
"address": "contact@yourcompany.com",
"type": "email"
}
},
{
"contact": {
"id": "-7253526752",
"name": "Jack Barberry",
"photoUrl": "awesome-pics.com/2837635958764.jpg",
"isMostLikely": false
},
"serviceIdentifier": {
"id": "7846320423",
"address": "contact@yourcompany.com",
"type": "email"
}
}
],
"to": [
{
"contact": {
"id": "8432948324923",
```

FIG. 4B

```
"name": "James Johnson",
"photoUrl": "awesome-pics.com/2837632958764.jpg"
},
"serviceIdentifier": {
"id": "123214566",
"address": "james@email.com",
"type": "email"
}
}
],
"cc": [
{
"contact": {
"id": "84932472304",
"name": "Alice Kellerton",
"photoUrl": "awesome-pics.com/2937632958764.jpg"
},
"serviceIdentifier": {
"id": "73846234823",
"address": "alice@hotmail.com",
"type": "email"
}
}
],
"bcc": []
}
],
"numberOfAttachments": 1,
"originalMsgGrpId": "23591262334",
"readDate": "2012-10-09T20:30:40.678+00:00",
"refersTo": "89213720343",
"securefy": {},
"sendOn": "2015-10-19T20:10:40.678+00:00",
"sentSuccessfully": true,
"snippet": "Hey guys, we are modifying company policy regarding email...",
"snoozedUntil": null,
"source": {
"type": "internal"
},
"subject": "Policy Updates",
"tags": "work, yourcompany",
"type": "multi",
"uid": 5723,
"updatedOn": "2012-10-09T20:30:40.678+00:00"
}
```

FIG. 4C

SYSTEMS AND METHODS FOR MULTI-PROTOCOL, MULTI-FORMAT UNIVERSAL SEARCHING

CROSS-REFERENCE TO RELATED APPLICATIONS

This application is related to co-pending, commonly-assigned U.S. patent application Ser. No. 14/187,699, filed Feb. 24, 2014, entitled "System And Method of Message Threading for a Multi-Format, Multi-Protocol Communication System" ("the '699 application"). This application is also related to co-pending, commonly-assigned U.S. patent application Ser. No. 14/579,712, filed Dec. 22, 2014, entitled "System and Method of Personalized Message Threading for a Multi-Format, Multi-Protocol Communication System" ("the '712 application"). This application is also related to co-pending, commonly-assigned U.S. patent application Ser. No. 14/986,219, filed Dec. 31, 2015, entitled "Systems and Methods for Filtering of Computer Vision Generated Tags Using Natural Language Processing" ("the '219 application"). The '699 application, the '712 application, and the '219 application are hereby incorporated by reference in their entireties.

TECHNICAL FIELD

This disclosure relates generally to systems, methods, and computer readable media for enhanced document and/or message searching across multiple communications formats and protocols.

BACKGROUND

The proliferation of personal computing devices in recent years, especially mobile personal computing devices, combined with a growth in the number of widely-used communications formats (e.g., text, voice, video, image) and protocols (e.g., SMTP, IMAP/POP, SMS/MMS, MPP, etc.) has led to a communications experience that many users find fragmented and difficult to search for relevant information in. Users desire a system that will provide searching across different data object types, across multiple formats and protocols, with ease and accuracy.

With current communications and searching technologies, different types of messages and other different types of data objects tend to be "siloed" within particular formats or protocols, causing users to be unable to search uniformly across multiple communications and other data objects in multiple formats or protocols, across multiple applications and across multiple other computing devices from their computing devices to find relevant search results. This can be time consuming, inefficient and frustrating. For example, a user may have to search for emails in an email system, and search for a video file in a different location. Moreover, due to the passage of time, the user may be unaware that a topic searched with regard to one data object type (e.g., emails) might have yielded relevant results if a different type (e.g., image files) had been searched.

Furthermore, with searching technologies, searching methods tend to be uniform—"one size fits all"—regardless of the preferences and individual characteristics of the person who is doing the searching.

The subject matter of the present disclosure is directed to overcoming, or at least reducing the effects of, one or more of the problems set forth above. To address these and other issues, techniques that enable seamless, multi-format, multi-protocol storage, searching and retrieval are described herein.

BRIEF DESCRIPTION OF THE DRAWINGS

FIG. 1A is a block diagram illustrating a server-entry point network architecture infrastructure, according to one or more disclosed embodiments.

FIGS. 4A-C contain a code-representation of an exemplary universal message object.

DETAILED DESCRIPTION

Figure 1B:
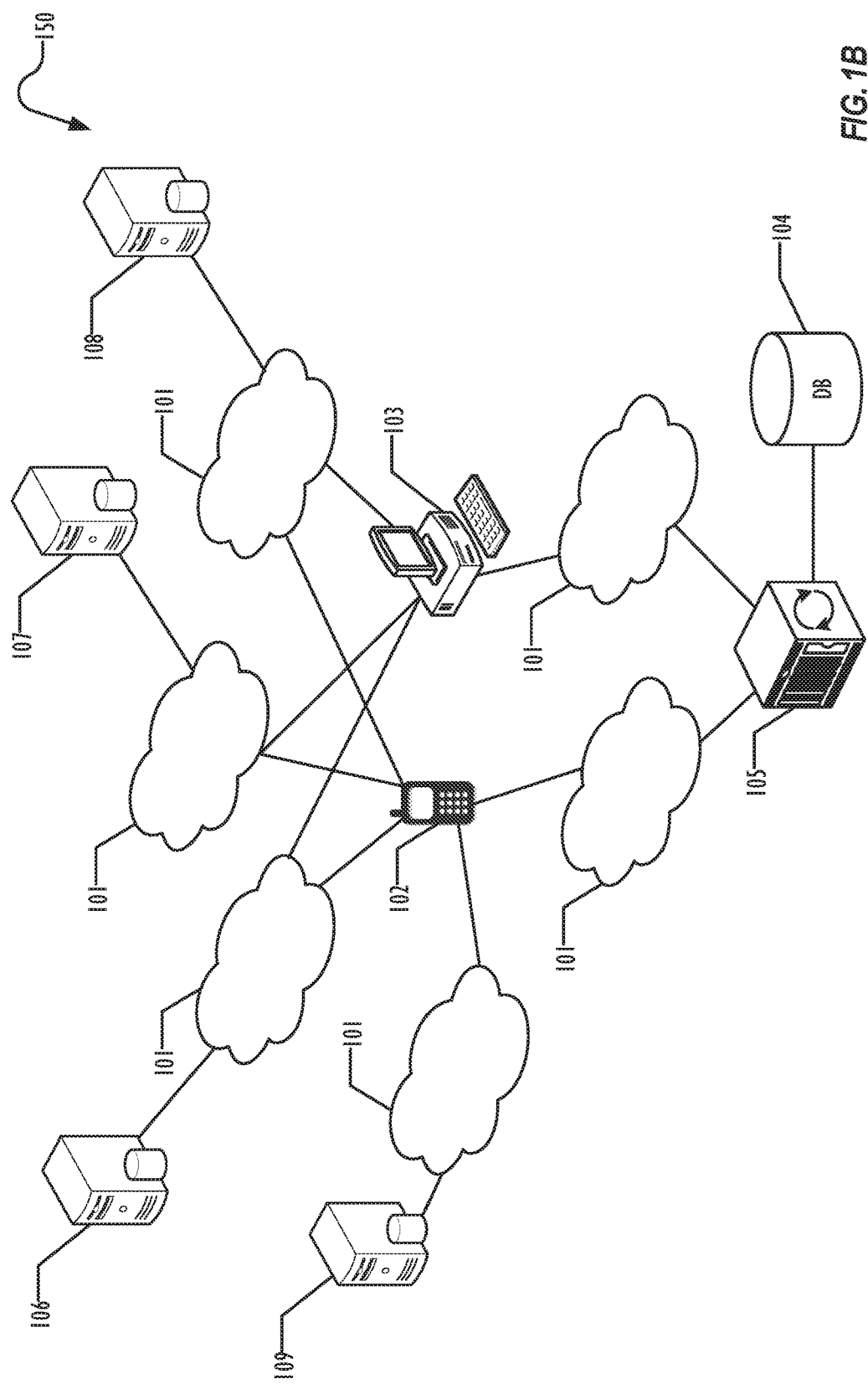
FIG. 1B is a block diagram illustrating a client-entry point network architecture infrastructure, according to one or more disclosed embodiments.

Disclosed are systems, methods, and computer readable media for intelligent, personalized indexing, storing, searching, and retrieval of data objects for computing devices across multiple formats and multiple protocols. More particularly, but not by way of limitation, this disclosure relates to systems, methods, and computer readable media to permit computing devices, e.g., smartphones, tablets, laptops, wearable devices, and the like, to provide a user searching experience across multi-format/multi-protocol data objects that can be stored in one or more centralized servers. For simplicity and ease of understanding, many examples and embodiments are discussed with respect to data objects of one type (e.g., emails). However, unless otherwise noted, the examples and embodiments may apply to other data object types as well (e.g., audio, video data, images, SMS messages).

As noted above, the proliferation of personal computing devices and data object types has led to a searching experience that many users find fragmented and difficult. Users desire a system that will provide for searching across differing data object types, across multiple formats and protocols, with ease and accuracy. Such searching can be enabled by personalizing the way data objects (e.g., emails, text messages, portable data files, image files, video files, etc.) are stored and indexed. Such searching can further be enabled by providing search tools (such as a universal search engine), which can be personalized according to the personal preferences and searching behaviors of an individual user. Furthermore, both the manner in which objects are indexed and the search tools used to search for the objects can be updated according to personalizing factors, such as, but not limited to: user messaging syntax, past searching behaviors, the types of data objects a user has searched for previously, the tendency for a user to search for information about a particular subject or in relation to another user, or group of users, etc.

Use of a multi-format, multi-protocol, indexing system allows users to view/preview all of their image files, audio files, messages, conversations, documents, calendar events, etc., which are related (or potentially related) to a particular query, in a single, unified results feed. Further, a multi-format, multi-protocol, universal search system, such as is disclosed herein, may also provide ongoing updating of search parameters based on machine learned (and/or user input) preferences and other personalizing factors.

For example, for a given set of data objects, (e.g., communications between two users, image files shared between two users), there may be only a dozen or so keywords that are relevant and related to the subject matter of the communications and/or image files, as determined by one or a number of associated algorithms designed to detect keyword importance. These dozen or so keywords may be used to generate an "initial tag cloud" to associate with the data object(s) for indexing purposes. The initial tag cloud can be created based on multiple factors, such as the uniqueness of a particular word, the number of times a word is repeated, phrase detection, etc. These initial tag clouds may then themselves be used to further generate an expanded "predictive tag cloud," based on the use of Markov chains, other predictive analytics based on established language theory techniques, and data derived from existing object data in a centralized server. Such derived data can include, but is not limited to unique data derived from the communication patterns of one and/or multiple users utilizing the centralized server when interacting with one and/or multiple other users and non-users of the centralized server. These initial tag clouds and predictive tag clouds may be used when indexing data objects and can provide enhanced relevancy (through ongoing personalization) in search results. The tag clouds themselves may be updated as new information is learned about a particular user. In doing so, the centralized server may establish connections between data objects of varying formats and/or protocols.

In at least one embodiment of this disclosure, data objects of varying types are stored on a per-user basis. Thus when a user searches, she searches only through her files, which means that the data set searched is much smaller than the data set that would be searched, for example, using a traditional web search engine. As will be discussed below, smaller data sets that are focused and isolated from one another need to be managed and indexed differently from much larger data sets. The management and indexing techniques disclosed herein help provide a more personalized user experience.

At least one embodiment of this disclosure is a searching system which can be personalized for individual users, which can work across different object types and protocol streams, and can enable a macro-analytics process to improve the personalization when necessary. Systems and methods described herein can be adapted to operate within a server architecture wherein a central server and various client devices may "switch roles," that is, varying which device is "acting" as the server in a particular scenario. For example, in some scenarios, a client device (e.g., a user's mobile phone) can act as the server for certain tasks. Furthermore, the central server, which would usually perform regular user functions (e.g., data storage, searching, etc.), can act as a simple pass-through entity; as opposed to the more common situation, wherein the central server is serving in a more traditional role, such as handling the bulk of processing and data manipulation tasks on behalf of the clients.

One aspect of providing a personalized user experience involves the use of universal message objects (UMOs). Data objects of varying types (including, but not limited to, messages) may be converted to (or referenced to) a UMO within the system. This means that every type of message/object (in any protocol) in the systems disclosed, can be treated and stored substantially the same way, streamlining the entire user experience and enabling efficient searching across multi-protocol, multi-format objects. Implementation of the UMO helps to enable universal searching because searches can be directed to files of the same type and can be routed to a specific user's content only. Because the systems disclosed store information on a per-user basis (including messages, contacts, files, calendar events), when a search is performed, most non-relevant content/information is (effectively) screened "up front." As will be explained in greater detail below, this "up front" screening can lead to a better user experience than provided by systems that search, retrieve, and then de-select (or assign a lower rank to) results based on relevance. Thus, searching becomes faster/more efficient, and results are more finely tuned to the user requesting a search. Storing and tracking data objects on a per-user basis enables truly personalized indexing and mapping of every object, so that searching and the mechanics of indexing are weighted for the individual user, rather than abstractly or generically.

At least one embodiment of this disclosure is a centralized system that maps users and their accounts in relation to where the user is geographically located and/or where a user's data is stored within a data center. This system is primarily for 'on-network' interactions, that is, interactions between individual system users that do not implicate protocols of other (i.e., external) systems. Such 'on-network' communications may thus already be in the aforementioned UMO format. Thus, if a user sends a UMO message, the message would go through the centralized communications system. Conversely, if a user sends a message using any other external protocols, the message would go through external systems, e.g., email delivery systems or any server with application programming interface (API)-type services, such as Google™, etc.

Mapping users and their accounts in relation to where users are geographically located, and/or where their data is stored within a data center, enables horizontal scaling across the world—and across multiple data centers in multiple locations (e.g., the East coast, west coast and Europe.) This can enable a database to be selected so as to be close to the actual user, thereby enabling faster searching. The location of the user's data can be changed to correspond to a change in the geographic location of the user, even on short-term basis. Thus, if a U.S. user visits Europe for a month, her data can be relocated from a data center in the U.S. to one in Europe. As noted above, an individual user's data can be isolated per main database and/or sectioned off per main database. Allocating a specific portion of a database on a per-user basis enables the personalization techniques described herein to be implemented much more efficiently than would otherwise be the case.

An embodiment of this disclosure is a system that allows all of a user's content to be centralized and searched from any device. The system can centralize content such as different emails, different data, different text messages, different instant messages, images/pictures (that have been analyzed and auto-tagged), videos, and audio files (that have been analyzed), for example.

In the prior art, communication data systems tend to be device-specific and often do not go "into" the content that they store. Most prior art systems use only file names and/or metadata. Systems described herein go deeper into the content, which allows for a personalized and universal search methodology in a multi-format multiprotocol communications system, wherein a user can identify different file types via intelligent analysis. Thus, a user can search through any object that can be indexed, and any base index can be searched. Within this disclosure, indexing is not a static function. Rather, an index is maintained, trained, updated, and configured to learn on a per user basis, across any file type. That these functions are personalized ultimately makes searching across multiple file easier.

Also disclosed herein is an index analyzer. The index analyzer can create and map indexed relationships. As noted above, the system analyzes personalized data and patterns, including natural language patterns, and whatever such information can be learned about a specific user. This type of information is then used to update the index analyzer. The provision of an index analyzer increases the relevancy of search output, that is, the operations of the index analyzer increase the likelihood that the information that is desired by the searcher is also retrieved. Moreover, searching can be performed without extra runtime filtering and computation. Because indexing is done when new content is received— "at the front end"—and updated on an ongoing basis based on user patterns, the relevance of search results is greatly enhanced. As intimated above, the index relationships for one user can be very different from indexing relationships of another user. The personalized indexing can be achieved, at least in part, by customized analyzers (plug-ins) written for the database, whereas the database itself is not (necessarily) modified. Additionally, data can be organized so as to make the use of analyzers more efficient. For example, a plug-in can be re-generated every time an artificial intelligence (AI) server detects a significant event for a user, or notes that a particular user pattern continues to be honored. For example, a given user might search for items that tend to be old, whereas another might tend to search for items that are new, so could be an index trigger for the index for relevancy. Language can be a factor as well. For example, a user might refer to a dwelling as an apartment while living in the U.S. and then move to another country and start using the word flat, or start using the expression "to let" instead of "for rent." An intelligent analyzer can identify the change while keeping the meaning, so that a search for one term would produce results relevant to both terms.

In another non-limiting example, a user might want to find a picture that a certain person (e.g., his friend Bob) sent to him that depicts a certain subject (e.g., Bob and his Bob's pet), via a general query. The universal search approach of this disclosure allows a user to search for specific items— but in a general way—using natural language, regardless of the format or channel through which the message/file came. So, the user could, for example, search for "that picture Bob sent me of him with his Llama" without having to tell the system to search for a JPEG file or the like.

As new data/content is on-boarded to the system, the data/content gets categorized and sharded, and insights that are derived from analyzing the data, for example language patterns, can be used to create an overarching user-personality profile containing key information about the user. That key information can be used to influence the weights of the various criteria of the index analyzer for that particular user. The index analyzer for a particular user can be automatically updated on an ongoing, as-needed, as-appropriate, or periodic basis, for example. Additionally, a current instance of an analyzer can be used by a user to perform a search, while another (soon to be more current) instance of the analyzer updates. Thus, for example, the words and expressions that a particular user uses when searching, can become part of a machine learned pattern. If a user on-boards email accounts, an index analyzer will pull historical data from the accounts and analyze that data. One or more analyzers discussed herein can comprise one or more variations of algorithms.

Also disclosed herein is an artificial intelligence (AI) server, which can comprise a full text search analyzer. The AI server can run a variety of tools and processes involving neural networks, deep learning, and/or pattern recognition, for example. The AI server can runs analyses on communication patterns of one or more users, and determine settings and user mappings. Output from the AI server can be fed into a custom analyzer, such as one written for Elasticsearch™. Elasticsearch™ provides a distributed, multitenant-capable full-text search engine with a HTTP web interface and schema-free JSON documents. When utilized, the default settings of such a server can be customized. Data is run through neural network to identify patterns. For example, the neural network examines all of the user's data, and has access to all activity which gets logged into server. For example, the AI server can identify that a user tends to search for old documents, or old addresses, through use of a patterns analyzer. The AI server can enable searching rules to be created based on the searched data itself, thereby obviating the need for "hands on" customization. The AI server can determine index patterns, history, personality, interests, and the existence of connected services, and the like. The AI server can, over time, 'understand' user intent more accurately to create a better index. For example, user behavior could indicate that the user rarely reviews, searches, or otherwise acts on content older than two months, therefore, index weight parameters can adjust the analyzer to de-prioritize results which are older than two months. However, different user's behavior could demonstrate the opposite pattern, such as by, searching for (on average) older archive data; thereby increasing importance of older content for the user. In another non-limiting example, user behavior could demonstrate a sustained pattern of searching for "people" rather than messages (i.e. by often selecting people results instead of messages containing those peoples' names). Therefore, the index analyzer would learn to prioritize names in creating the index weight and relationship map. Furthermore, each new learned word can be gradually added to a user's corpus and included in any analyzer update, for content, future and past, in order to account for the fact a user's language pattern can change over time.

As information is received by the system, each data object (email, for example) gets spliced and sharded down into a universal message object (UMO). This is done to standardize various data types for later search and retrieval. Data gets stored and fragmented according to a primary database relational model so that it can be accessed later. Thus, data gets tied to users, tied to accounts, profiles, etc. UMO information is passed to AI server and analyzed. Analysis can be done in an iterative manner; the method that the AI server uses to determine insights is dependent on the output of each successive method. For example, the AI server would not run a facial recognition algorithm on an image file in the event that it had previously been determined that there were no faces in the image. An AI server can look for key words and pictures, patterns of behavior, general communication patterns over time, (by using an optimal suggestion engine), and a user's patterns of activity. The AI server can generate a number of insights based such information. The insights can be used to generate certain cues which can impact the analyzers discussed above.

In at least one embodiment, when new information (such as a new data object) is received by the system, an analyzer immediately begins to index the data object according to a standard. Once the AI server determines that there are other cues that can enrich the analyzer, it will initiate a parallel update to the analyzer which can re-index all of a user's data based on the new information. The manner in which this updating occurs can itself be weighted according to previously learned information about the user. For example, the AI analyzer can recognize that a user's searches tend to find some types of content more than others. The AI analyzer can note which people your previous searches related to, and give more weight to results based on that person than on others. The AI analyzer can also take into account how often a user performs searches. If a user searches infrequently, the analyzer will require less updating. A user who performs frequent searches will have more updates. The details of a user's search patterns can affect a neural network manager, enabling searching rule to be updated based on found past found data.

In at least one embodiment, the system also abstracts a usage profile of every user into a "global registry" to short cut development of profiles of others. For example, a user's behavior, personality and volume of messages could be substantially similar to another user's. The system, due to its detailed nature, enables the creation of many personality types. Moreover, because the system is multi-format, multiprotocol based patterns in data can be detected that would otherwise be undetectable. An individual's search can be based on his or her personal characteristics which can be learned as described above. An individual's search can be positively infused by a major macro registry that analyzes user patterns, and pushes down new ideas based on the analyzed patterns.

At least one embodiment of this disclosure is a system that is individually sharded with multiple formats and channels of data types that can be distilled down to a user level for the purpose of producing a user-specific index pattern. The user-specific index pattern can be used for a universal object search system, as detailed herein. The system establishes the right analyzer (on an ongoing basis) and then simply delivers search results based on terms. Because of this ordering, personalization is possible in a universal context.

Referring now to FIG. 1A, a server-entry point network architecture infrastructure 100 is shown schematically. Infrastructure 100 contains computer networks 101. Computer networks 101 include many different types of computer networks, such as, but not limited to, the World Wide Web, the Internet, a corporate network, and enterprise network, or a Local Area Network (LAN). Each of these networks can contain wired or wireless devices and operate using any number of network protocols (e.g., TCP/IP). Networks 101 may be connected to various gateways and routers, connecting various machines to one another, represented, e.g., by sync server 105, end user computers 103, mobile phones 102, and computer servers 106-109. In some embodiments, end user computers 103 may not be capable of receiving SMS text messages, whereas mobile phones 102 are capable of receiving SMS text messages. Also shown in infrastructure 100 is a cellular network 103 for use with mobile communication devices. Cellular networks support mobile phones and many other types of devices (e.g., tablet computers not shown). Mobile devices in the infrastructure 100 are illustrated as mobile phone 102. Sync server 105, in connection with database(s) 104, may serve as the central "brains" and data repository, respectively, for the multi-protocol, multi-format communication composition and inbox feed system to be described herein. Sync server can comprise an artificial intelligence (AI) server, or be in signal with an external AI server (not shown). In the server-entry point network architecture infrastructure 100 of FIG. 1A, centralized sync server 105 may be responsible for querying and obtaining all the messages from the various communication sources for individual users of the system and keeping the multi-protocol, multi-format inbox feed for a particular user of the system synchronized with the data on the various third party communication servers that the system is in communication with. Database(s) 104 may be used to store local copies of messages sent and received by users of the system, data objects of various formats, as well as individual documents associated with a particular user, which may or may not also be associated with particular communications of the users. Database(s) can be used to store universal message objects corresponding to such messages, documents, and other data objects. As such, the database portion allotted to a particular user can contain a record of all communications in any form to and from the user.

Server 106 in the server-entry point network architecture infrastructure 100 of FIG. 1A represents a third party email server (e.g., a GOOGLE® or YAHOO!® email server). (GOOGLE is a registered service mark of Google Inc. YAHOO! is a registered service mark of Yahoo! Inc.) Third party email server 106 may be periodically pinged by sync server 105 to determine whether particular users of the multi-protocol, multi-format communication composition and inbox feed system described herein have received any new email messages via the particular third-party email services. Server 107 represents a represents a third party instant message server (e.g., a YAHOO!® Messenger or AOL® Instant Messaging server). (AOL is a registered service mark of AOL Inc.) Third party instant messaging server 107 may also be periodically pinged by sync server 105 to determine whether particular users of the multi-protocol, multi-format communication composition and inbox feed system described herein have received any new instant messages via the particular third-party instant messaging services. Similarly, server 108 represents a third party social network server (e.g., a FACEBOOK® or TWITTER® server). (FACEBOOK is a registered trademark of Facebook, Inc. TWITTER is a registered service mark of Twitter, Inc.) Third party social network server 108 may also be periodically pinged by sync server 105 to determine whether particular users of the multi-protocol, multi-format communication composition and inbox feed system described herein have received any new social network messages via the particular third-party social network services. It is to be understood that, in a "push-based" system, third party servers may push notifications to sync server 105 directly, thus eliminating the need for sync server 105 to periodically ping the third party servers. Finally, server 109 represents a cellular service provider's server. Such servers may be used to manage the sending and receiving of messages (e.g., email or SMS text messages) to users of mobile devices on the provider's cellular network. Cellular service provider servers may also be used: 1) to provide geo-fencing for location and movement determination; 2) for data transference; and/or 3) for live telephony (i.e., actually answering and making phone calls with a user's client device). In situations where two 'on-network' users are communicating with one another via the multi-protocol, multi-format communication system itself, such communications may occur entirely via sync server 105, and third party servers 106-109 may not need to be contacted.

Referring now to FIG. 1B, a client-entry point network architecture infrastructure 150 is shown schematically. Similar to infrastructure 100 shown in FIG. 1A, infrastructure 150 contains computer networks 101. Computer networks 101 may again include many different types of computer networks available today, such as the Internet, a corporate network, or a Local Area Network (LAN). However, unlike the server-centric infrastructure 100 shown in FIG. 1A, infrastructure 150 is a client-centric architecture. Thus, individual client devices, such as end user computers 103 and mobile phones 102 may be used to query the various third party computer servers 106-109 to retrieve the various third party email, IM, social network, and other messages for the user of the client device. Such a system has the benefit that there may be less delay in receiving messages than in a system where a central server is responsible for authorizing and pulling communications for many users simultaneously. Also, a client-entry point system may place less storage and processing responsibilities on the central multi-protocol, multi-format communication composition and inbox feed system's server computers since the various tasks may be distributed over a large number of client devices. Further, a client-entry point system may lend itself well to a true, "zero knowledge" privacy enforcement scheme. In infrastructure 150, the client devices may also be connected via the network to the central sync server 105 and database 104. For example, central sync server 105 and database 104 may be used by the client devices to reduce the amount of storage space needed on-board the client devices to store communications-related content and/or to keep all of a user's devices synchronized with the latest communication-related information and content related to the user. It is to be understood that, in a "push-based" system, third party servers may push notifications to end user computers 102 and mobile phones 103 directly, thus eliminating the need for these devices to periodically ping the third party servers.

Figure 2A:
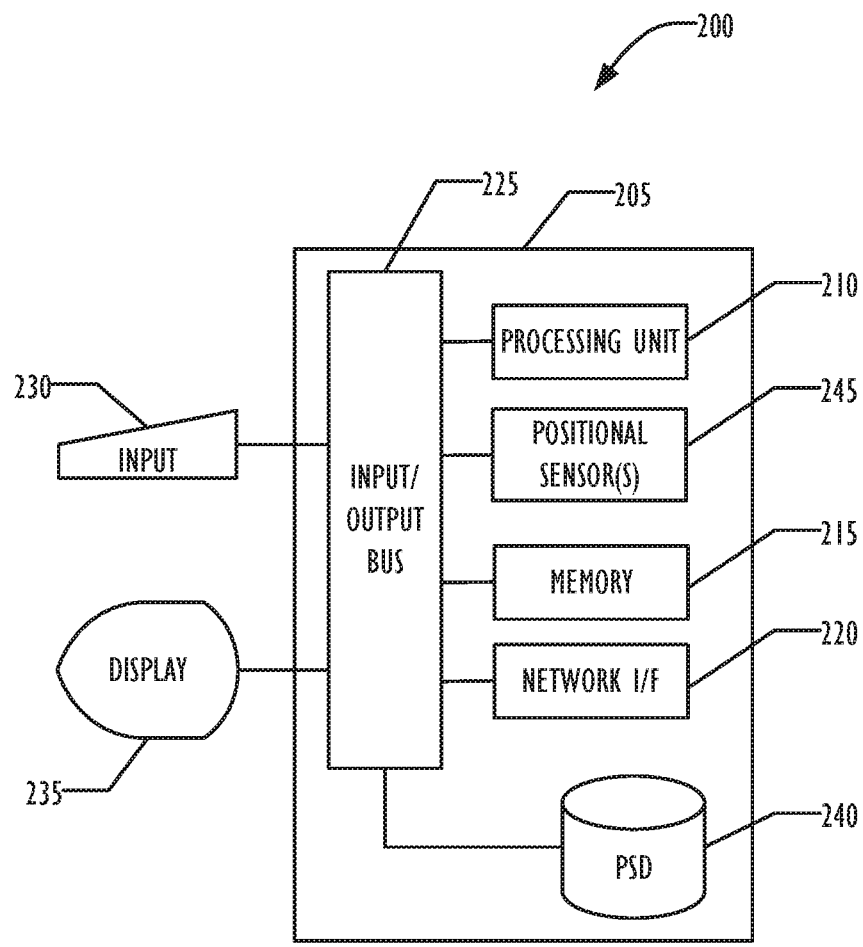
FIG. 2A is a block diagram illustrating a computer which could be used to execute the multi-format, multi-protocol contextualized indexing approaches described herein according to one or more disclosed embodiments.

Referring now to FIG. 2A, an example processing device 200 for use in the communication systems described herein according to one embodiment is illustrated in block diagram form. Processing device 200 may serve in, e.g., a mobile phone 102, end user computer 103, sync server 105, or a server computer 106-109. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
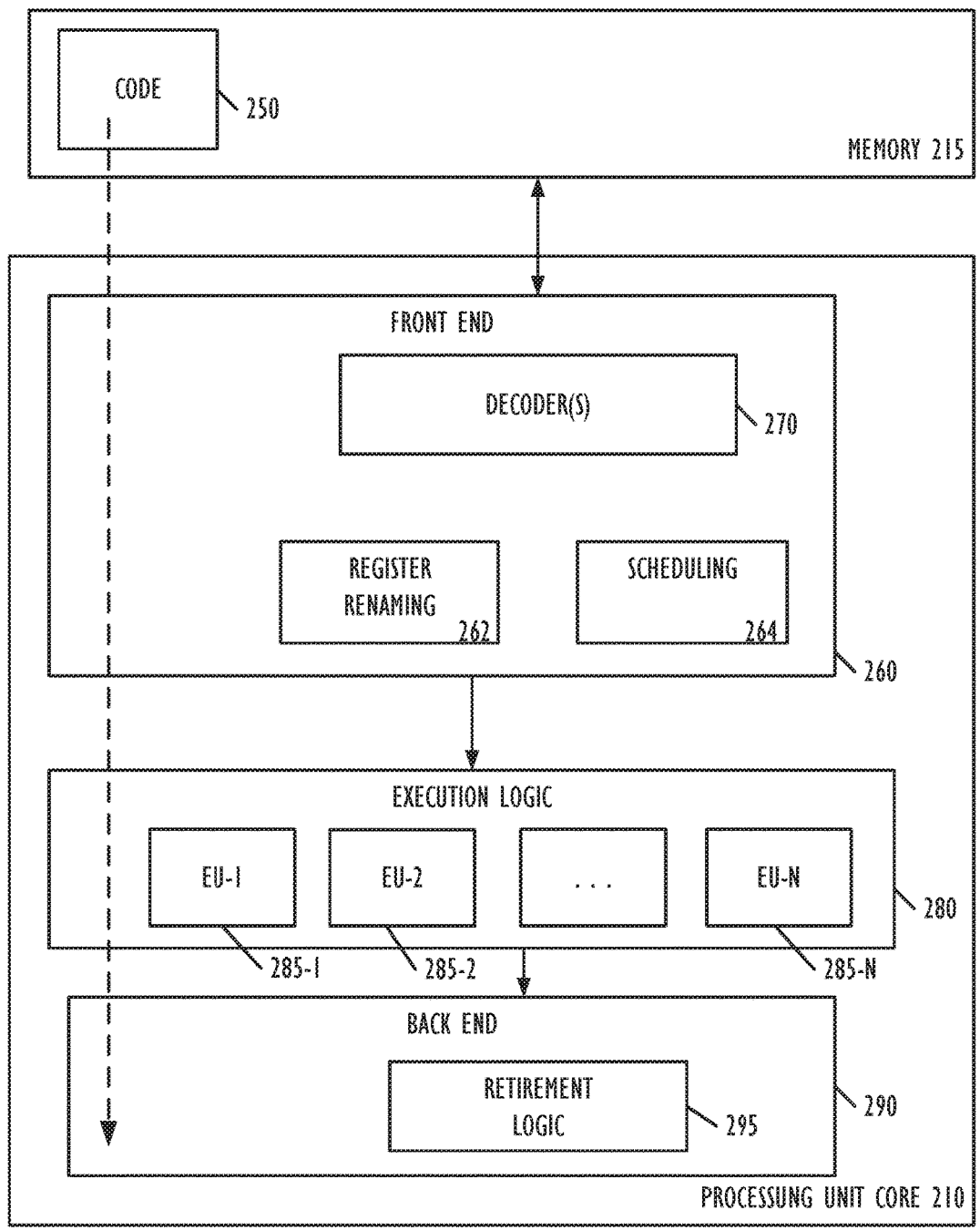
FIG. 2B is a block diagram illustrating a processor core, which may reside on a computer according to one or more disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

In a multi-protocol, person-centric, indexing and storage method, a message or other data object can be received by the system (100, 150). The message can be a universal message object (UMO), or can be converted into a UMO or can have a UMO designated which corresponds to the message. The system can then save the UMO according to a message saving procedure. The system can thereafter continue indexing and receiving new messages/objects.

Figure 3:
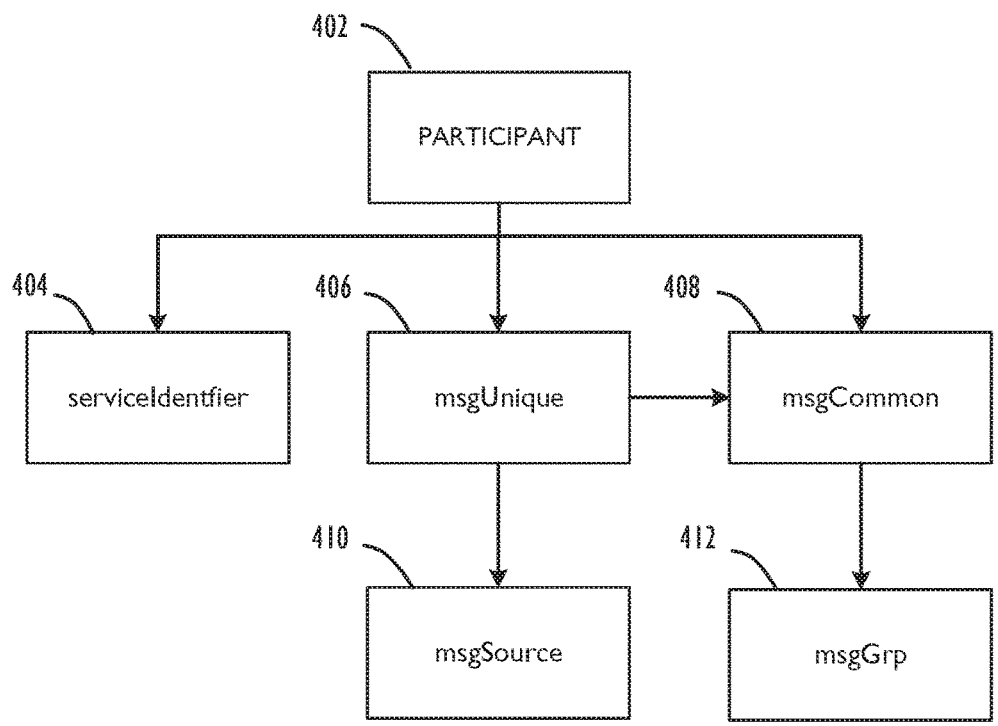
FIG. 3 illustrates a database representation of a universal message object according to one or more disclosed embodiments.

FIG. 3 illustrates a database (104) representation of a UMO, as discussed above. Portions of a UMO include a participant (user) 402 table, a service identifier 404 table, indicating the service through which a message was received or sent, a unique message identifier 406 corresponding to the UMO itself, a msg common 408 table linking the message to other relevant messages as determined by one or methods of this disclosure, a msg source 410 table, indicating the source of the message, and a msg group 412 table, identifying a group to which the participant 402 belongs. In at least one embodiment, msgCommon 408 can essentially be a cache which holds information from the msgUnique table 406, (an algorithm determines what to take from 406, when there is more than one per msgCommon). This allows all of the queries to use a table which nicely built indexes that do not need to be "collapsed" when queried to leave the result with only a single message. Otherwise, indexes which are unusable and which decimate the performance of queries could result. The database (104) stores an original copy of the source of each sub-message (which could be multiple copies for an SMS which needed to be broken into pieces, for example). The database (104) would only contain a single row in the msgCommon table, even though two messages may have actually been sent. Thus a "single message" is stored, though it may be common to more than one user. In this example, the database (104) would contain two rows in the msgUnique table to track information which is particular to any of the sub-messages, for example, whether or not the message was sent successfully, the date of the message, its unique identifier, and the like. In the example illustrated in FIG. 3, the participant table contains a single row for each serviceIdentifier from/to/cc/bcc each of the sub-messages, and links to the appropriate sub-message in order to keep them distinct. The diagram of FIG. 3 is also applicable for Internet of Things (IoT) related recipients without any modification. In that situation, each IoT endpoint has a special serviceIdentifier designated for it. In most instances, a UMO will belong to only a single message group, which can enable the UMO to interact with multi-protocol groups.

In at least one embodiment, the system (100, 150) may use semantic matching (or other search-based/keyword message association techniques) to associate messages and other data objects, such as universal message objects. According to another embodiment, element-matching techniques may be employed to associate messages and other data objects. Matching of objects can be used to weight searches and affect indexing of data, as disclosed herein.

JavaScript Object Notation (JSON) is an open standard format that uses human-readable text to transmit data objects consisting of attribute-value pairs. It is the primary data format used for asynchronous browser/server communication. At least one embodiment of a universal message object (UMO) of this disclosure is a single JSON entity, which can be used to represent any message in any protocol, including messages from/to different and/or multiple protocols. The UMO is represented as a single JSON object throughout the system (100, 150), unless it is stored inside a main relational database (see FIG. 3), where it is broken into multiple pieces to enable simpler, faster queries, smaller storage and index space, and overall better handling of multi-protocol messages.

FIGS. 4A-C contain a full JSON representation of an example UMO. FIGS. 4A-C illustrate that a single object can be used to represent a message sent as both an email and a text. The email and the text are both from the same person (contact), but are sent from different services having different identifiers (email address or SMS number). It will be understood that example of FIGS. 4A-C could also cover IoT related recipients. It can be seen in FIGS. 4A-C that the email is sent from an address which belongs to multiple contacts for the user (that is, a shared email address, such sharing being common to many organizations). Furthermore, the UMO contains both possible contacts, however, only a single one is marked as being the most likely contact to have sent the message. It can also be seen that certain fields of the message shown in FIGS. 4A-C are a combination of both the sub-messages. In this example, the 'sent-Successfully' field will only be set to "true" once both messages have been sent.

Figure 5:
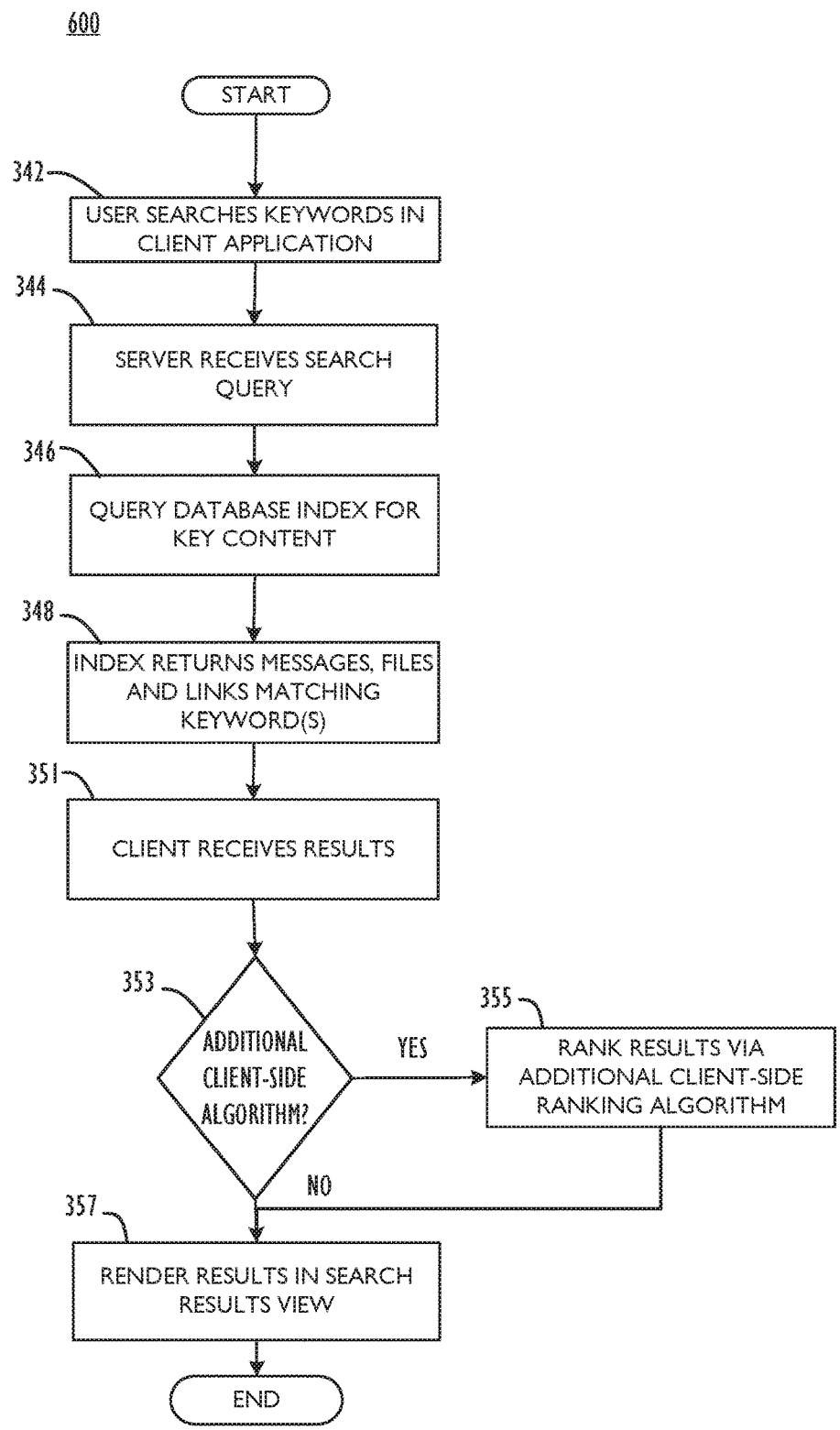
FIG. 5 is a flow diagram illustrating an example of a multi-protocol, person-centric, searching and retrieval method, according to one or more disclosed embodiments.

FIG. 5 illustrates an example universal multi-format, multi-protocol search method 600. The method 600 starts and proceeds to block 342, in which a user searches for keywords in a client application, such as by entering search terms in a user interface of a client application (see FIG. 6). After the user searches for keywords, the server (105) receives a search query at block 344. The method then proceeds to block 346, in which a database (104) index is queried for key content. Thereafter, at block 348, the index can return messages, files, and links matching the keywords. The method 600 can then proceed to block 351, in which the client (user) receives the search results. The method then proceeds to block 353 in which it is determined whether there is a client-side algorithm to be applied to the search results. If there is no such algorithm, the method can proceed to block 357, in which the search results are rendered in a search results view on, for example a display of an electronic device (102). In event there is a client-side algorithm, the algorithm can be applied to the search results, such as by ranking the search results in order of their relevance to the user's original search (see block 342). Use or implementation of one or more client-side algorithms can be beneficial in situations involving client-side encrypted material in which the client will have information not contained by the server. The method 600 can then proceed to block 357 above. The method 600 can then end.

Figure 6:
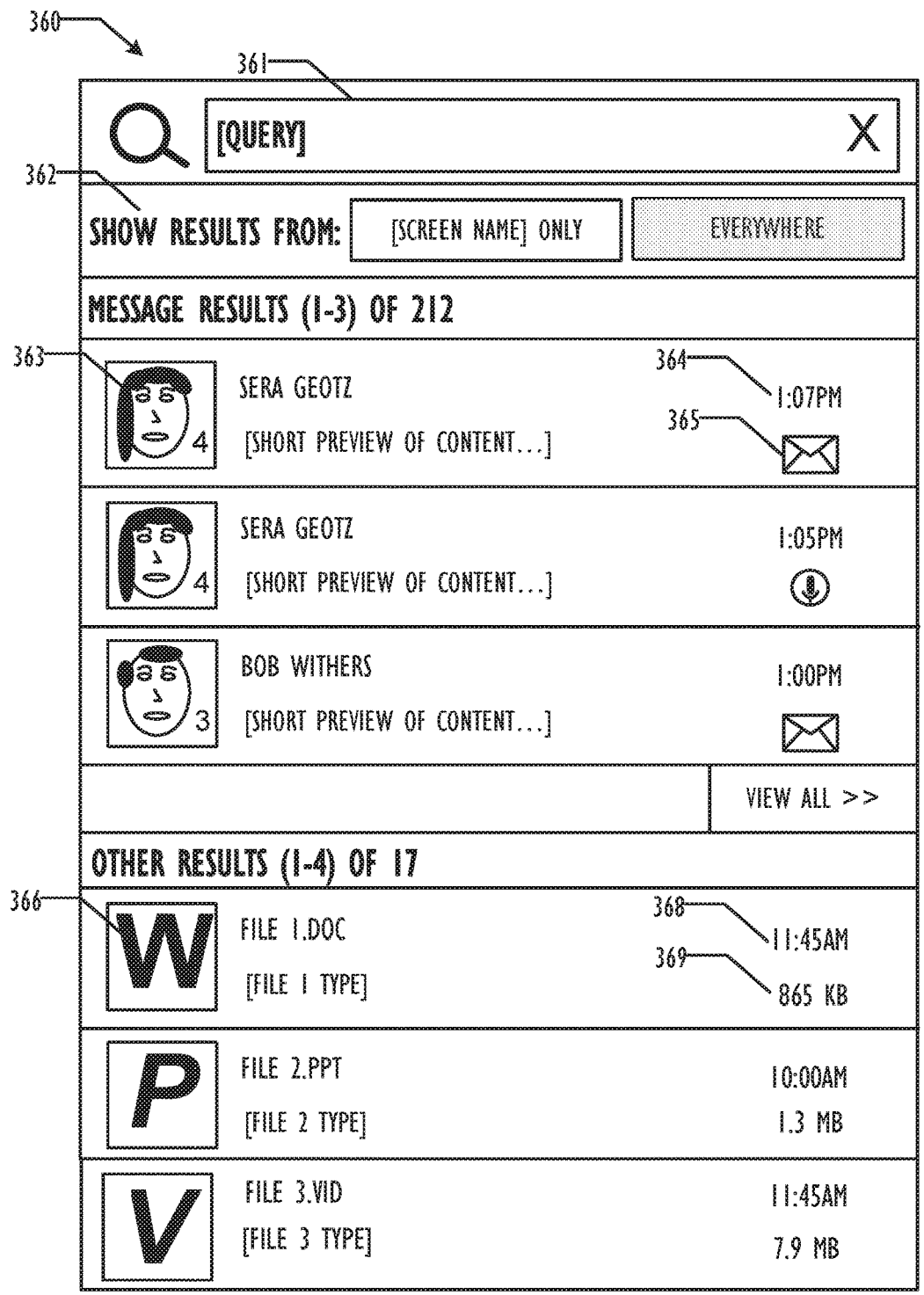
FIG. 6 shows an example of a multi-format, multi-protocol, universal search results page for a particular query, according to one or more disclosed embodiments.

Referring now to FIG. 6, an example of a multi-format, multi-protocol universal search results page 360 for a particular query is shown, according to one or more disclosed embodiments. At the top of the page 360 may be a search input box 361. A user may, enter his or her desired query string into the search input box 361 and then click on the magnifying glass icon to initiate the search process. Search results row 362 may be used for providing the user with a choice of additional search-related features. For example, the user may be provided with a selection between a "global" search, i.e., searching everywhere in the application's ecosystem, and a "narrow" search, i.e., searching only through content on a screen or small collection of screens. As shown in FIG. 6, search results 363 may be displayed in a unified feed or can be grouped by type (e.g., messages, files, etc.), query type, search area selection (e.g., "global" v. "narrow"), or time. Each search result may optionally include an indication of the messages format 365 and/or a time stamp 364 to provide additional information to the user. A given implementation may also optionally employ an "Other Results" feed 366 as a part of the same user interface that displays the search results 363. Such other results could include, for example, information pertaining to a user's contacts, such as an indication that a user was a source of a particular message or group of messages, or that a particular user was the source of particular documents. These results could come from sources other than traditional message-related sources, and exist in other formats, e.g., a user's personal file collection stored in a centralized database, data object of various formats (e.g., personal profile information from contacts of the user, video files, audio files, and any other file/data object that can be indexed as disclosed herein). Search results could also include tags corresponding to portions of visual files/visual data objects. Such tags can be generated by an AI system wich analyzes images and/or videos. The possible sources and results identified are included by way of illustration, not limitation.

EXAMPLES

Example 1 is a non-transitory computer readable medium that comprises computer readable instructions, which, upon execution by at least one or more processing units, cause the one or more processing units to obtain a first plurality of data objects for a first user, wherein the first plurality of data objects comprises: one or more data objects in each of a first plurality of formats; and one or more data objects sent or received via each of a first plurality of protocols. The computer readable instructions can cause the processors to designate a first plurality of universal message objects, each universal message object (UMO) corresponding to at least a portion of a data object from among the first plurality of data objects; create one or more associations between one or more of the first plurality of UMOs, receive a query from the first user requesting at least one UMO from the first plurality of UMOs, generate one or more index search terms based, at least in part, on the received query; and generate a set of one or more search results including one or more UMOs from among the first plurality of UMOs, in response to the generated one or more index search terms. The set of one or more search results set can be based, at least in part, on one or more index parameters for one or more of the generated one or more index search terms. One or more index parameters can be determined individually for the first user.

Example 2 includes the subject matter of example 1, wherein the instructions further include instructions to cause the one or more processing units to determine a relevancy score for the one or more search results, rank the one or more search results, based at least in part on the relevancy score associated with each result, and render on a display, the one or more search results based at least in part on the ranking of the search results.

Example 3 includes the subject matter of example 2, wherein the instructions further include instructions to cause the one or more processing units to revise the one or more index parameters based, at least in part, on the relevancy score for each of the search results.

Example 4 includes the subject matter of example 1, wherein the instructions further include instructions to cause the one or more processing units to revise the one or more index parameters based, at least in part, on part historical search patterns of the first user, types of data typically searched by the first user, and keywords typically favored by the first user.

Example 5 includes the subject matter of example 1, wherein the instructions further include instructions to cause the one or more processing units to revise the one or more index parameters based, at least in part, on detected language patterns of the first user, and an age of data objects typically searched by the first user.

Example 6 includes the subject matter of example 1, wherein the instructions further include to cause the one or more processing units to: create a profile for the first user, the profile containing attributes of the first user obtained through analysis of searching behaviors of the first user, and assign the profile to a second user based, at least in part, on similarities between the first user and the second user.

Example 7 includes the subject matter of example 1, wherein the first plurality of formats includes, but is not limited to JPEG, AVI, ASF, WMA, WMV, and WM.

Example 8 is a system which comprises a memory and one or more processing units, communicatively coupled to the memory. The memory stores instructions to cause the one or more processing units to obtain a first plurality of messages for a first user, wherein the first plurality of messages comprises one or more messages in each of a first plurality of formats, and one or more messages sent or received via each of a first plurality of protocols, create one or more associations between one or more of the first plurality of messages; receive a query from the first user requesting at least one message from the first plurality of messages, generate one or more index search terms based, at least in part, on the received query, and generate a result set of messages in response to the generated one or more index search terms. The result set can be based on one or more index search parameters for one or more of the generated one or more index search terms. The index search parameters can determined individually for the first user according to the needs and preferences of the user.

Example 9 includes the subject matter of example 8, wherein the memory further stores instructions to cause the one or more processing units to determine a relevancy score for the one or more search results, rank the one or more search results, based at least in part on the relevancy score associated with each result, and render on a display, the one or more search results based at least in part on the ranking of the search results.

Example 10 includes the subject matter of example 9, wherein the memory further stores instructions to cause the one or more processing units to revise the one or more index parameters based, at least in part, on the relevancy score for each of the search results.

Example 11 includes the subject matter of example 8, wherein the memory further stores instructions to cause the one or more processing units to revise the one or more index parameters based, at least in part, on part historical search patterns of the first user, types of data typically searched by the first user, and keywords typically favored by the first user.

Example 12 includes the subject matter of example 8, wherein the memory further stores instructions to cause the one or more processing units to revise the one or more index parameters based, at least in part, on detected language patterns of the first user, and an age of data objects typically searched by the first user.

Example 13 includes the subject matter of example 8, wherein the memory further stores instructions to cause the one or more processing units to create a profile for the first user, the profile containing attributes of the first user obtained through analysis of searching behaviors of the first user and assign the profile to a second user based, at least in part, on similarities between the first user and the second user.

Example 14 includes the subject matter of example 8, wherein the first plurality of formats comprises JPEG, AVI, ASF, WMA, WMV, and WM.

Example 15 is a computer-implemented method, comprising: obtaining a first plurality of data objects for a first user, wherein the first plurality of data objects comprises: one or more data objects in each of a first plurality of formats; and one or more data objects sent or received via each of a first plurality of protocols; designating a first plurality of universal message objects, each universal message object (UMO) corresponding to at least a portion of a data object from among the first plurality of data objects; creating one or more associations between one or more of the first plurality of UMOs; receiving a query from the first user requesting at least one UMO from the first plurality of UMOs; generating one or more index search terms based, at least in part, on the received query; and generating a set of one or more search results including one or more UMOs from among the first plurality of UMOs, in response to the generated one or more index search terms, wherein the set of one or more search results set is based, at least in part, on one or more index parameters for one or more of the generated one or more index search terms, and wherein at least one of the one or more index parameters is determined individually for the first user.

Example 16 includes the subject matter of example 15, wherein the method further comprises: determining a relevancy score for the one or more search results; ranking the one or more search results, based at least in part on the relevancy score associated with each result; and rendering on a display, the one or more search results, based at least in part on the ranking of the search results.

Example 17 includes the subject matter of example 16, wherein the method further comprises revising the one or more index parameters based, at least in part, on the relevancy score for each of the search results.

Example 18 includes the subject matter of example 15, wherein the one or more index parameters are based, at least in part, on part historical search patterns of the first user, types of data typically searched by the first user, and keywords typically favored by the first user.

Example 19 includes the subject matter of example 15, wherein the method further comprises revising the one or more index parameters based, at least in part, on detected language patterns of the first user, and an age of data objects typically searched by the first user.

Example 20 includes the subject matter of example 15, further comprising: creating a profile for the first user, the profile containing attributes of the first user obtained through analysis of searching behaviors of the first user; and assigning the profile to a second user based, at least in part, on similarities between the first user and the second user.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms such as "including" and "in which" are used as plain-English equivalents of the respective terms "comprising" and "wherein."

What is claimed is:
1. A non-transitory computer readable medium storing computer readable instructions, which, upon execution by at least one or more processing units, cause the one or more processing units to:
    obtain a first plurality of data objects for a first user, wherein the first plurality of data objects comprises:
        one or more data objects in each of a first plurality of formats; and
        one or more data objects sent or received via each of a first plurality of protocols;
    designate a first plurality of message objects, each message object corresponding to at least a portion of a data object from among the first plurality of data objects;
    create one or more associations between one or more of the first plurality of message objects;
    receive a query from the first user requesting at least one message object from the first plurality of message objects;
    generate one or more index search terms based, at least in part, on the received query;
    generate a set of one or more search results including one or more message objects from among the first plurality of message objects, in response to the generated one or more index search terms, wherein the set of one or more search results set is based, at least in part, on one or more index parameters for one or more of the generated one or more index search terms, and wherein at least one of the one or more index parameters is determined individually for the first user;

determine from a syntax of one or more communications of the first user that an expression has a meaning corresponding to a first index search term; and create an index parameter based on the expression and assign it to each data object corresponding to the first index search term.

2. The non-transitory computer readable medium of claim 1, further storing instructions to cause the one or more processing units to:

determine a relevancy score for the one or more search results;

rank the one or more search results, based at least in part on the relevancy score associated with each result; and render on a display, the one or more search results based at least in part on the ranking of the search results.

3. The non-transitory computer readable medium of claim 2, further storing instructions to cause the one or more processing units to revise the one or more index parameters based, at least in part, on the relevancy score for each of the search results.

4. The non-transitory computer readable medium of claim 1, further storing instructions to cause the one or more processing units to revise the one or more index parameters based, at least in part, on historical search patterns of the first user, types of data typically searched by the first user, and keywords typically favored by the first user.

5. The non-transitory computer readable medium of claim 1, further storing instructions to cause the one or more processing units to revise the one or more index parameters based, at least in part, on detected language patterns of the first user, and an age of data objects typically searched by the first user.

6. The non-transitory computer readable medium of claim 1, further storing instructions to cause the one or more processing units to:

create a profile for the first user, the profile containing attributes of the first user obtained through analysis of searching behaviors of the first user; and assign the profile to a second user based, at least in part, on similarities between the first user and the second user.

7. The non-transitory computer readable medium of claim 1, wherein the search results include messages from at least two different protocols.

8. A system, comprising:
a memory; and
one or more processing units, communicatively coupled to the memory, wherein the memory stores instructions to cause the one or more processing units to:
obtain a first plurality of messages for a first user, wherein the first plurality of messages comprises:
one or more data objects in each of a first plurality of formats; and
one or more data objects sent or received via each of a first plurality of protocols;
create one or more associations between one or more of the first plurality of messages;
receive a query from the first user requesting at least one message from the first plurality of messages;
generate one or more index search terms based, at least in part, on the received query;

generate a set of one or more search results in response to the generated one or more index search terms, wherein the result set is based, at least in part, on one or more index search parameters for one or more of the generated one or more index search terms, and wherein at least one of the one or more index search parameters is determined individually for the first user;

determine from a syntax of one or more communications of the first user that an expression has a meaning corresponding to a first index search term; and create an index parameter based on the expression and assign it to each data object corresponding to the first index search term.

9. The system of claim 8, the memory further storing instructions to cause the one or more processing units to:

determine a relevancy score for the one or more search results;

rank the one or more search results, based at least in part on the relevancy score associated with each result; and render on a display, the one or more search results based at least in part on the ranking of the search results.

10. The system of claim 9, further storing instructions to cause the one or more processing units to revise the one or more index search parameters based, at least in part, on the relevancy score for each of the search results.

11. The system of claim 8, further storing instructions to cause the one or more processing units to revise the one or more index search parameters based, at least in part, on part historical search patterns of the first user, types of data typically searched by the first user, and keywords typically favored by the first user.

12. The system of claim 8, the memory further storing instructions to cause the one or more processing units to revise the one or more index search parameters based, at least in part, on detected language patterns of the first user, and an age of data objects typically searched by the first user.

13. The system of claim 8, further storing instructions to cause the one or more processing units to:

create a profile for the first user, the profile containing attributes of the first user obtained through analysis of searching behaviors of the first user; and assign the profile to a second user based, at least in part, on similarities between the first user and the second user.

14. The system of claim 8, wherein the results include messages from at least two different protocols.

15. A computer-implemented method, comprising:
obtaining a first plurality of data objects for a first user, wherein the first plurality of data objects comprises:
one or more data objects in each of a first plurality of formats; and
one or more data objects sent or received via each of a first plurality of protocols;
designating a first plurality of message objects, each message object corresponding to at least a portion of a data object from among the first plurality of data objects;
creating one or more associations between one or more of the first plurality of message objects;
receiving a query from the first user requesting at least one message object from the first plurality of message objects;
generating one or more index search terms based, at least in part, on the received query;

generating a set of one or more search results including one or more message objects from among the first plurality of message objects, in response to the generated one or more index search terms, wherein the set of one or more search results set is based, at least in part, on one or more index parameters for one or more of the generated one or more index search terms, and wherein at least one of the one or more index parameters is determined individually for the first user;

determining from a syntax of one or more communications of the first user that an expression has a meaning corresponding to a first index search term; and creating an index parameter based on the expression and assign it to each data object corresponding to the first index search term.

16. The computer-implemented method of claim 15, further comprising:

determining a relevancy score for the one or more search results;

ranking the one or more search results, based at least in part on the relevancy score associated with each result; and rendering on a display, the one or more search results, based at least in part on the ranking of the search results.

17. The computer-implemented method of claim 16, further comprising revising the one or more index parameters based, at least in part, on the relevancy score for each of the search results.

18. The computer-implemented method of claim 15, further comprising the one or more index parameters based, at least in part, on part historical search patterns of the first user, types of data typically searched by the first user, and keywords typically favored by the first user.

19. The computer-implemented method of claim 15, further comprising revising the one or more index parameters based, at least in part, on detected language patterns of the first user, and an age of data objects typically searched by the first user.

20. The computer-implemented method of claim 15, further comprising:

creating a profile for the first user, the profile containing attributes of the first user obtained through analysis of searching behaviors of the first user; and assigning the profile to a second user based, at least in part, on similarities between the first user and the second user.

* * * * *